May 8, 1951　　　　　W. SPANN　　　　　2,552,228
CLAW FORK

Filed Feb. 10, 1947　　　　　　　　　　2 Sheets-Sheet 1

Inventor
Woodard Spann

By *Clarence A. O'Brien
and Harvey B. Jacobson*
Attorneys

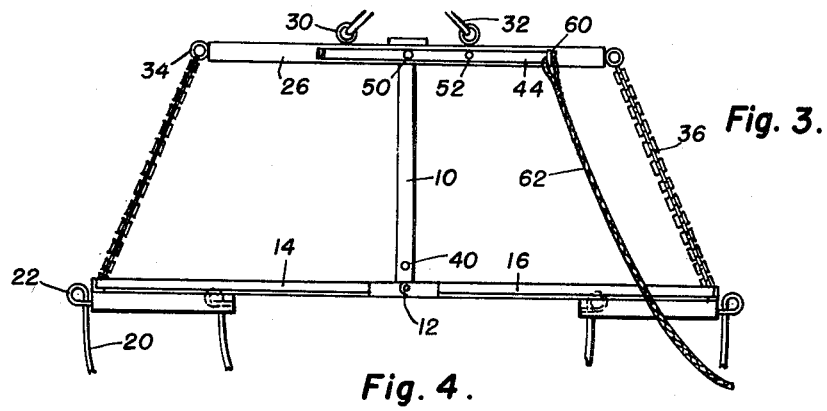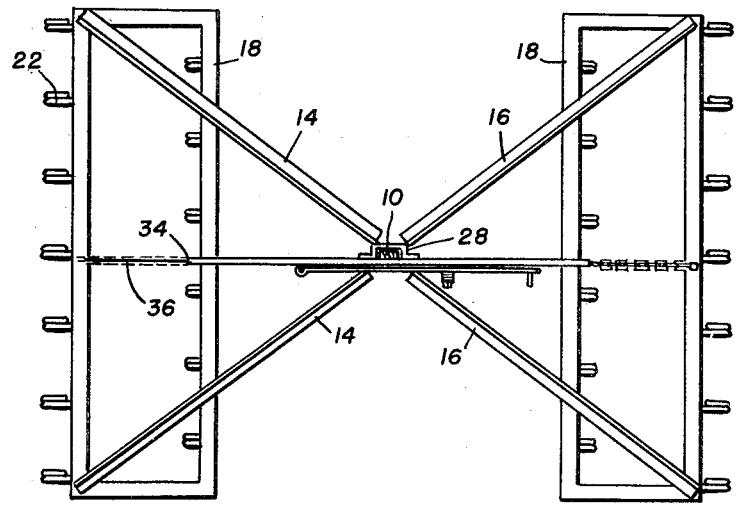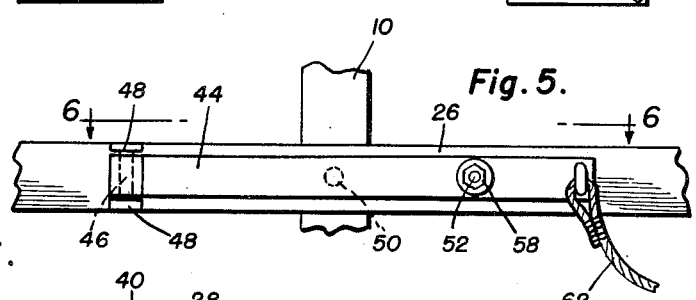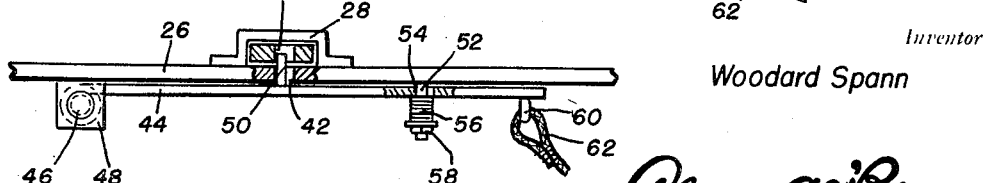

Patented May 8, 1951

2,552,228

UNITED STATES PATENT OFFICE 2,552,228

CLAW FORK

Woodard Spann, Gunnison, Colo.

Application February 10, 1947, Serial No. 727,571

5 Claims. (Cl. 294—109)

The present invention comprises novel and useful improvements in a claw fork and more specifically pertains to a hay fork having hinged jaws together with an improved operating means for opening and closing said jaws.

The principal objects of this invention consist in providing a hay fork or the like which shall be of a simple and dependable construction, easily operable and maneuverable, and which may be controlled as to positioning of the fork, opening and closing the same by one man and by remote control; to provide a fork operating means wherein the lifting means may be operated to cause the fork tines to effectively bed themselves in a mass of hay or the like; to provide in a hay fork hinged jaws together with an operating means therefor and an effective latch means for retaining the operating means in selected operative positions.

These, together with various ancillary objects of the invention which will later become apparent as the following description proceeds, are realized by this invention, one embodiment of which has been illustrated, by way of example only, in the accompanying drawings, wherein:

Figure 3 is a side elevational view of a portion of the mechanism shown in Figures 1 and 2, part of the lifting cable being omitted, and showing the device in its fully opened position, together with the operating means in its latched open position;

Figure 4 is a top plan view of the claw fork shown in Figure 3;

Figure 5 is an enlarged fragmentary view in front elevation showing the latch means mounted upon the operating means, and Figure 6 is a top plan view of the latch mechanism taken substantially upon the section 6—6 of Figure 5.

Figure 1:
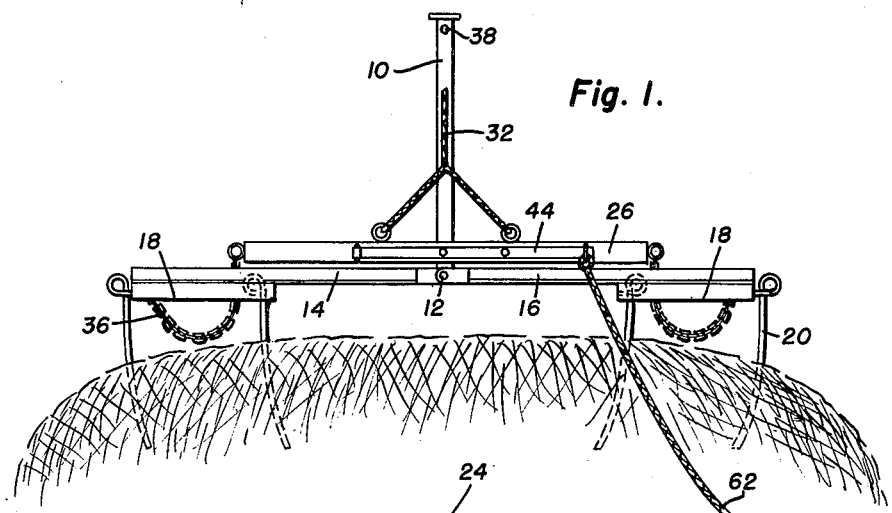
Figure 1 is a side elevational view showing the device after the operating means has caused the tines to become embedded in a mass of hay.

Reference is now made more particularly to the annexed drawings, wherein like numerals indicate similar parts throughout the various views and wherein 10 designates a support bar upon the lower end of which is pivoted as at 12 a pair of fork arms 14 and 16 provided with the customary flexible fork tines 20.

As shown more clearly in Figure 4, the fork arms preferably consist of an angularly disposed pair of angle irons whose outer extremities are connected to a generally rectangular frame 18, in such manner that the side members of each of the arms 14 and the rectangular frame 18 form a triangle whose apex is pivoted upon the support bar 10, and wherein each of the arm members 14 and the rectangular base 18 are adapted to form a rigid operating unit hinged upon the support rod by the pivot pin 12.

As indicated clearly at 22 in Figure 4, each of the tines 20 are provided with a loop of material to form a spring whereby the tines are flexibly carried by the members 18, there being any suitable number of rows of tines carried thereby.

At its upper end, the support rod 10 is preferably provided with a headed or enlarged portion 24 providing a stop means for a purpose to be subsequently set forth.

As so far described, it will be readily understood that when the arms members 14 and 16 are raised to a horizontal position relative to the vertically disposed support rod 10, as in Figures 1 and 3, the tines will be generally disposed in their open positions, whereby they may readily penetrate a mass of hay or the like or be released therefrom.

Figure 2:
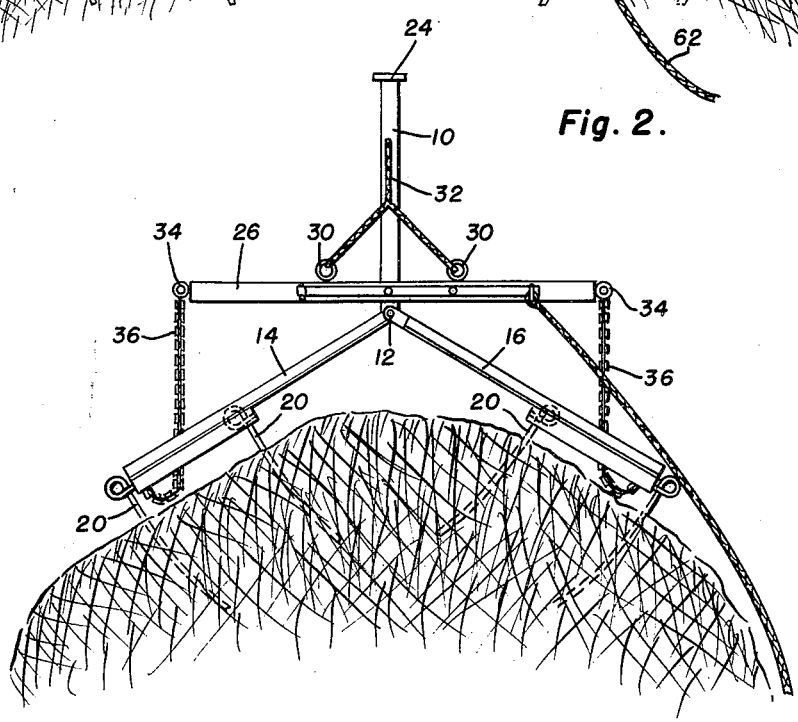
Figure 2 is a side elevational view as the fork is being lifted, showing the next step in the operation of the device from that shown in Figure 1, and illustrating the teeth and jaws closing upon the mass of hay.

When now the support rod 10 is lifted, it will be seen that the weight of the fork arms 14 and 16 will cause the latter to pivot about their support pin 12, whereby the tines 20 will tend to dig into and grip the mass of hay or the like as indicated clearly in Figure 2.

In order to effectively operate the fork, previously described, the following operating mechanism is provided. A transverse bar, 26, preferably of great weight such as about a 100 pounds or the like, is disposed for sliding movement longitudinally of the support rod 10, being retained and guided thereon as by a suitable strap or guide member 28, shown best in Figures 4 and 6. Upon opposite sides of the guide member 28, the transverse bar 26 is provided with a pair of supporting hooks or eyes 30 to which are fastened the bifurcated ends of a lifting cable 32. As will be readily understood, the cable 32 may form part of any suitable fork lifting mechanism, such as one operated by a drum, pulleys or the like. It will thus be seen that the transverse bar 26 is free to slide longitudinally of the support rod 10 between the ends thereof, being retained thereon as by the headed portion 24 and the pivoted ends of the fork arms 14 and 16.

At its extremities, the transverse bar 26 is provided with eyes 34 to which are secured chains 36 suitably attached to the base members 18 of the fork arms 14 and 16, as shown best in Figure 4. The length of chain is preferably so adjusted that when the transverse bar 26 is disposed in its upper position on the support bar 10, in a manner to be set forth hereinafter, the fork arms 14 and 16 are urged or supported in their horizontally extending position as shown in Figure 3, whereby the fork tines and fork arms are open to their maximum extent. When, however, the transverse bar 26 is lowered upon the support rod 10, the slack in the chains 36 releases the ends of the fork arms and permits the fork arms to close in a manner to be set forth hereinafter.

Attention is now directed more clearly to Figures 1, 3 and 6, wherein it may be seen that the supporting rod 10 is provided with a pair of apertures 38 and 40 adjacent the extremities thereof, while the transverse bar 26 is provided with an aperture 42 which is alignable with either of the apertures in the support bar 10, as the transverse bar is moved longitudinally thereof.

A latch means is provided for selectively securing or fixing the transverse bar at either extremity of the support rod 10 by means of the apertures 38, 40 and 42. For this purpose, the lever 44 is secured as by a pin 46 between a pair of laterally extending lugs 48 carried by the transverse bar 26, and is provided intermediate its ends with a latching pin 50 adapted to extend through the aperture 42 in the latching lever, and into one of the apertures 38 and 40 with which the transverse bar happens to be aligned. In order to urge the latching lever into its seated position, a pin 52 extends laterally from the transverse bar 26 and through an aperture 54 in the lever 44. The end of this pin 52 is preferably screw threaded and is surrounded by a spring 56 whose tension is adjusted as by a nut 58. At its outer extremity, the latching lever is provided with an eye 60 to which is secured an operating cable 62 which extends to any suitable location whereby the latching lever may be removably controlled as set forth hereinafter.

From the foregoing, it is believed that the mode of operating the device will be now apparent. Assuming that the fork is suspended in its fully opened position from the support cable 32 in the position shown in Figure 3, it will be understood that the latch pin 50 is engaged in the apertures 42 and 38, whereby the transverse bar is locked in its upper position upon the support bar 10, and whereby the chains 36 hold the fork arms 14 and 16 in their horizontal open position. The device may now be lowered until the teeth or tines 20 are engaged upon and slightly penetrate the surface of the hay or other material to be gathered. At this time, it is intended that by manipulation of the cable 62, by an operator who may conveniently be at a remote distance from the fork, the latching lever 44 is pivoted about its pin 46 against the action of the spring 56, whereby the latching pin 50 is withdrawn from the apertures 42 and 38. Since suitable slack has preferably been introduced into the lifting cable 32, the heavy transverse bar 26 is now free to slide down upon the support rod 10, and produce an impact upon the horizontally disposed fork jaws 14 and 16 and their pivot pin 12, thereby driving the forks and embedding the same in the mass of material, this being the position indicated in Figure 1.

It is now intended that this downward travel of the transverse bar 26 upon the support bar 10 under the influence of gravity shall be sufficient to permit the spring pressed latch pin 50 to engage with the apertures 42 in the transverse bar 26 and the lowermost aperture 40 in the support bar 10. This is the relative position of the transverse and support rod and latching means shown in Figure 2.

Now, as the lifting cable 32 is elevated, the transverse bar 26 is likewise lifted and due to this latch engagement also elevates the support rod 10. As this rigidly locked assembly of bars 10 and 26 is elevated, the weight of the fork arms 14 and 16 causes the latter to pivot together upon their hinge pin 12, whereby the curved tines 20 more deeply penetrate into the mass of hay or other material and the tines and fork arms tend to close into the position shown in Figure 2. The fork, together with this mass of material gripped therein may now be lifted and maneuvered as desired. When it is desired to release the load of material from the fork arms, the latch lever 44 is again manipulated by means of the cable 62, thereby withdrawing the latching pin 50 from the aligned apertures, whereby the support rod 10 is free to slide downwardly through the guide 28 and relative to the transverse bar 26. This downward sliding movement is caused by the weight of the support of the fork arms 14 and 16 together with the mass of material carried thereby. As the rod 10 and arms 14 and 16 slide downwardly, the slack is taken up in the chains 36, and the latter now swings the arms outwardly to open the jaws of the fork thereby releasing the contents.

It will be readily apparent that the above described construction of fork and operating means may be manipulated in various manners and methods of operation and that considerable changes may be made in both mode of operation and structure within the broad principles of this invention. Accordingly, it is not desired to limit the protection sought to the exact construction shown and described, but all suitable modifications and equivalents may be resorted to falling within the scope of the appended claims.

What I claim is:

1. A hay fork comprising a vertical support bar, fork arms commonly pivoted at their inner ends to the lower terminal of the support bar for a simultaneous free closing movement, an actuating bar slidably mounted on the support bar for maintaining said arms in horizontal open positions and for imparting a downward driving force to the arms, flexible fastening means connecting the ends of said actuating bar and the outer ends of said fork arms, complementary releaseable retaining means on said actuating bar and support bar for locking the actuating bar in selected positions on the support bar.

2. A hay fork comprising a vertical support bar, cooperative fork arms pivoted at their inner ends to the lower terminal of the support bar, an operating bar vertically slidable on the support bar, lifting and supporting cables connected to the operating bar, means for releasably locking the operating bar to the upper end of the support bar, flexible connecting means between the opposing ends of the operating bar and the outer ends of the fork arms, said connecting means holding the fork arms in horizontal positions when the operating bar is locked to the upper end of the support bar, said operating bar upon release of the locking means imparting a downward driving thrust to the arms and means for releasably locking the operating bar on the lower end of the support bar so that the arms can be raised by the lifting and supporting cables while in closed relationship.

3. A hay fork comprising a vertical support bar, cooperative fork arms pivoted at their inner ends to the lower terminal of the support bar, an operating bar vertically slidable on the support bar, lifting and supporting cables connected to the operating bar, means for releasably locking the operating bar to the upper end of the support bar, flexible connecting means between the opposing ends of the operating bar and the outer ends of the fork arms, said connecting means holding the fork arms in horizontal positions when the operating bar is locked to the upper end of the support bar, said operating bar upon release of the locking means imparting a downward driving thrust to the arms and means for releasably locking the operating bar on the lower end of the support bar so that the arms can be raised by the lifting and supporting cables while in closed relationship, said locking means including a pivoted locking lever on said operating bar, said bar having an opening, a lateral lug carried by the lever and engageable in said opening and the upper and lower ends of the support bar being formed with openings registerable with the opening in the operating bar, and resilient means for urging said lug into the openings in the support bar.

4. A hay fork comprising a vertical support bar, cooperative fork arms pivoted at their inner ends to the lower terminal of the support bar, an operating bar vertically slidable on the support bar, lifting and supporting cables connected to the operating bar, means for releasably locking the operating bar to the upper end of the support bar, flexible connecting means between the opposing ends of the operating bar and the outer ends of the fork arms, said connecting means holding the fork arms in horizontal positions when the operating bar is locked to the upper end of the support bar, said operating bar upon release of the locking means imparting a downward driving thrust to the arms and means for releasably locking the operating bar on the lower end of the support bar so that the arms can be raised by the lifting and supporting cables while in closed relationship, said locking means including a pivoted locking lever on said operating bar, said bar having an opening, a lateral lug carried by the lever and engageable in said opening and the upper and lower ends of the support bar being formed with openings registerable with the opening in the operating bar, and resilient means for urging said lug into the openings in the support bar, and remote controlled release means connected to said locking lever.

5. A hay fork comprising a vertical support bar, cooperative fork arms pivoted at their inner ends to the lower terminal of the support bar, an operating bar vertically slidable on the support bar, lifting and supporting cables connected to the operating bar, means for releasably locking the operating bar to the upper end of the support bar, flexible connecting means between the opposing ends of the operating bar and the outer ends of the fork arms, said connecting means holding the fork arms in horizontal positions when the operating bar is locked to the upper end of the support bar, said operating bar upon release of the locking means imparting a downward driving thrust to the arms and means for releasably locking the operating bar on the lower end of the support bar so that the arms can be raised by the lifting and supporting cables while in closed relationship, and stop means on the upper end of the support bar.

WOODARD SPANN.

REFERENCES CITED

The following references are of record in the file of this patent:

UNITED STATES PATENTS

| Number | Name | Date |
|---|---|---|
| 120,160 | Moose | Oct. 24, 1871 |
| 456,624 | Lardner | July 28, 1891 |
| 1,039,737 | Hester | Oct. 1, 1912 |